United States Patent
Kawata

[11] Patent Number: 5,946,021
[45] Date of Patent: Aug. 31, 1999

[54] IMAGE PROCESSING SYSTEM

[75] Inventor: Toshiyuki Kawata, Hyogo, Japan

[73] Assignee: Mitsubishi Denki Kabushiki Kaisha, Tokyo, Japan

[21] Appl. No.: 07/672,497

[22] Filed: Mar. 20, 1991

[30] Foreign Application Priority Data

Oct. 12, 1990 [JP] Japan ................................. 2-274774

[51] Int. Cl.$^6$ .................. B41J 2/47; H04N 1/23
[52] U.S. Cl. .................. 347/237; 347/240; 358/298
[58] Field of Search .............. 346/160, 1.1, 107 R, 346/76 L, 108; 364/519; 358/296, 298, 300, 302, 455, 456, 457, 458, 459; 395/106, 109, 112

[56] References Cited

U.S. PATENT DOCUMENTS

| | | | |
|---|---|---|---|
| 4,567,488 | 1/1986 | Moriguchi et al. | 347/196 |
| 4,622,595 | 11/1986 | Hisatake et al. | 358/296 |
| 4,799,071 | 1/1989 | Zeise et al. | 347/233 |
| 4,835,549 | 5/1989 | Samejima et al. | 347/237 |
| 4,878,068 | 10/1989 | Suzuki | 347/253 |
| 4,878,072 | 10/1989 | Reiten | 347/236 |
| 4,885,597 | 12/1989 | Tschang et al. | 347/237 |
| 4,967,192 | 10/1990 | Hirane et al. | 347/237 X |

FOREIGN PATENT DOCUMENTS

| | | |
|---|---|---|
| 266241 | 5/1988 | European Pat. Off. . |
| 3738469 | of 0000 | Germany . |
| 3843645 | of 0000 | Germany . |
| 2134351 | 8/1984 | United Kingdom . |
| 2237700 | 5/1991 | United Kingdom . |

Primary Examiner—David F. Yockey
Attorney, Agent, or Firm—Rothwell, Figg, Ernst & Kurz

[57] ABSTRACT

In a image processing system for an electrophotographic printer, a density selective circuit selects density data of a pixel to be corrected in response to the black-and-white patterns of surrounding pixels in a line matrix, and a density correction operation circuit outputs a picture signal with corrected density data corrected by the selected density and other density correction coefficients, thereby the toner adhesion amount, i.e., the printing density is made uniform and a clear printed picture without density unevenness can be obtained irrespective of the content of the picture signal.

1 Claim, 10 Drawing Sheets

IMAGE PROCESSING SYSTEM

BACKGROUND OF THE INVENTION

1. Field of the Invention

The present invention relates to an image processing system for use in such as an electrophotographic printer for example.

2. Description of the Prior Art

Figure 8:
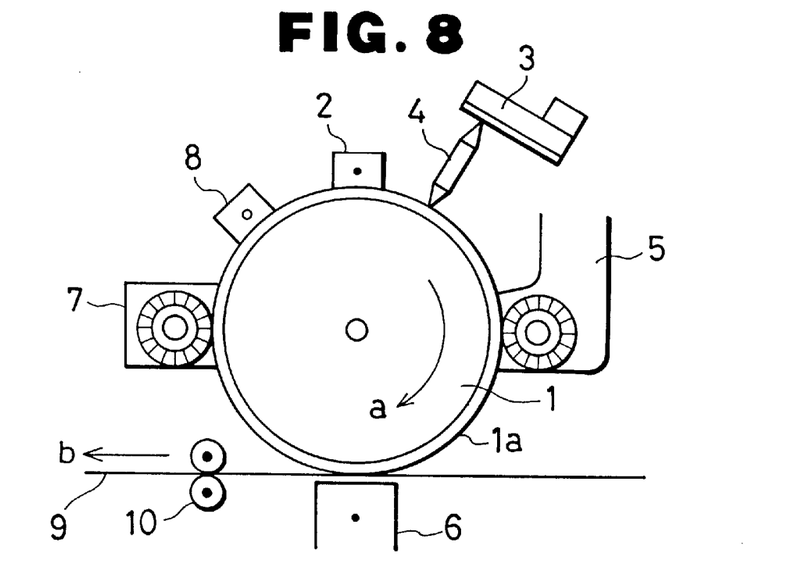
FIG. 8 is a schematic diagram of a conventional electrophotographic printer to which the present invention can be applied.

FIG. 8 is a schematic diagram showing the basic components of an electrophotographic printer. In FIG. 8, the electrophotographic printer comprises a photosensitive drum 1 supported to be rotatable in the direction of arrow "a", and around the photosensitive drum 1 is arranged electrophotographic equipment comprising an electrostatic charger 2, an LED print head 3 and a SELFOC lens array 4 constituting an image exposure system, a developing device 5, a print transfer device 6, a cleaning device 7 and a discharger 8. The electrophotographic printer also comprises transfer paper 9 which passes between the photosensitive drum 1 and the print transfer device 6 and is transported in the direction of arrow "b" by feed means (not shown), and a fixing device 10 where a toner image transferred from the photosensitive drum 1 to the transfer paper 9 is fixed to the transfer paper 9.

According to the above-mentioned constitution, while the photosensitive drum 1 is rotated in the arrow "a" direction, a latent image is formed on the surface of the photosensitive drum 1 which has been charged by the charger 2 through light focussed thereon by the image exposure system 3 and 4, and the latent image is made visible due to developing by the developing device 5, e.g. by the application of toner. After the visible image is transferred to the transfer paper 9 by the print transfer device 6, the surface of the photosensitive drum 1 is cleaned by the cleaning device 7 and subsequently discharged by the discharger 8, and then the charging is applied thereto again by the charger 2 and the above-mentioned process is repeated. On the other hand, the visible image transferred to the transfer paper 9 is fixed as a permanent image to the transfer paper 9 by the fixing device 10.

In the prior art, in the above-mentioned electrophotographic printer, a compact LED-head is adopted as part of a picture exposure system, but the LED chips corresponding to the individual pixels are several hundreds to several thousands in number per line and have different exposure amount characteristics.

Consequently, the LED head in the prior art transfers correction data to an LED driver IC so that uniform exposure can be performed.

Figure 9:
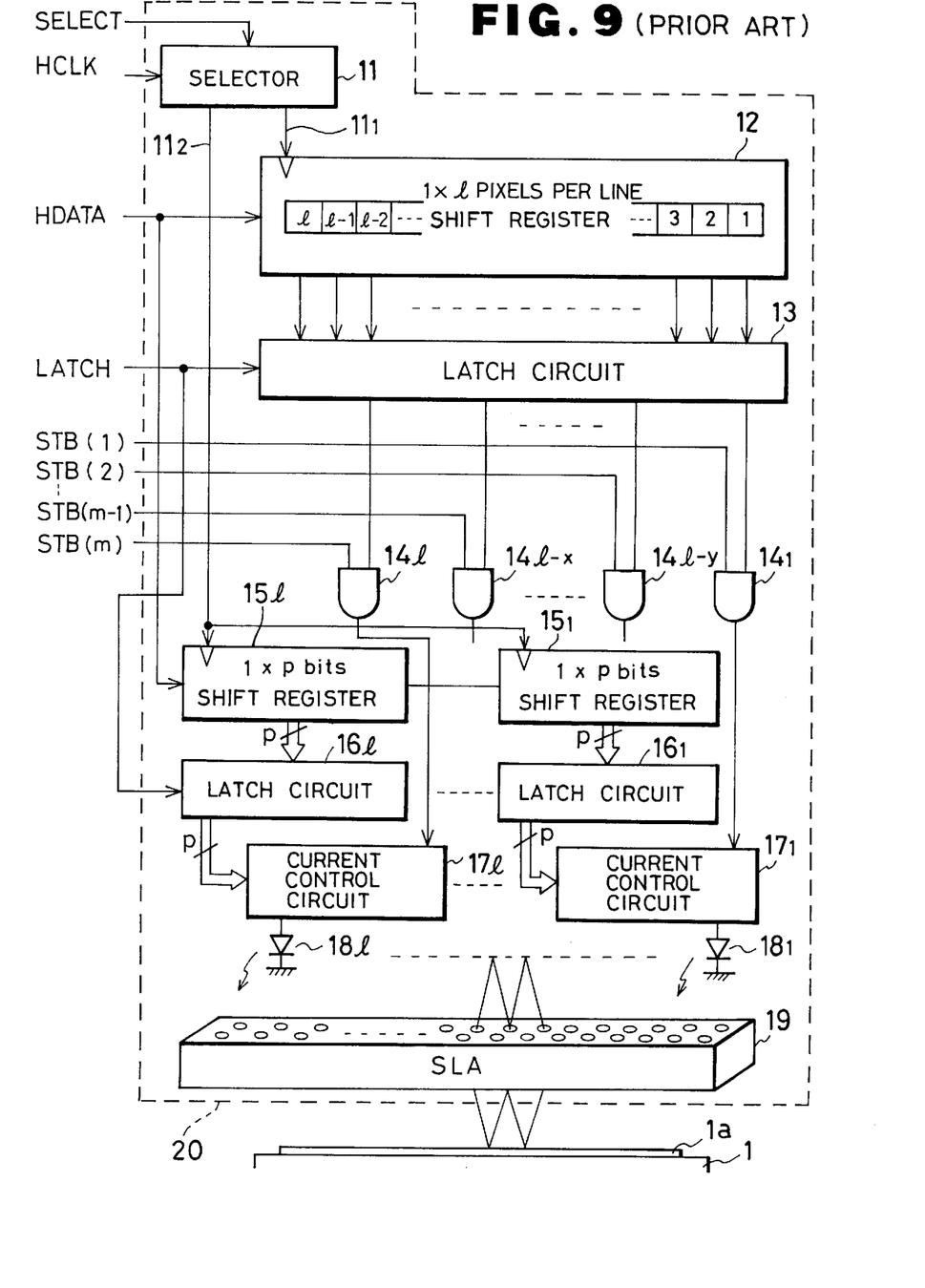
FIG. 9 is a constitution diagram of an LED-head in a picture processing apparatus in the prior art.

FIG. 9 is a block diagram showing the constitution of an LED-head 20 in the prior art constructed so that uniform exposure can be performed. In FIG. 9, the LED-head 20 comprises a selector 11 for changing a picture signal clock (HCLK) into a picture signal transferring clock $11_1$ or a correction data transferring clock $11_2$ by a select signal (SELECT), and a shift register 12 for inputting picture signal data (HDATA) by line (l pixels serially in synchronization with the picture signal transferring clock $11_1$.

The LED-head 20 also comprises a latch circuit 13 for accepting and storing the contents of the shift register 12 in response to a latch signal (LATCH), AND gates $14_1$–$14_l$, for outputting the logical sum of the image signal output from the latch circuit 13 and strobe signals $STB_1$–$STB_m$, and shift registers $15_1$–$15_l$ for serially inputting correction data to correct each LED light quantity by P bits in synchronization with the correction data transferring clock $11_2$.

The LED-head 20 further comprises latch circuits $16_1$–$16_l$ for accepting and storing the P-bit correction data from shift registers $15_1$–$15_l$ in response to LATCH signals, current control circuits $17_1$–$17_l$ for controlling current to actuate the LEDs in accordance with the content of the P-bit correction data, LED chips $18_1$–$18_l$ arranged in a line, and a SELFOC lens array (SLA) 19 for focusing light from the LED chips $18_1$–$18_l$ onto the photosensitive surface $1a$ of drum 1.

Figure 10:
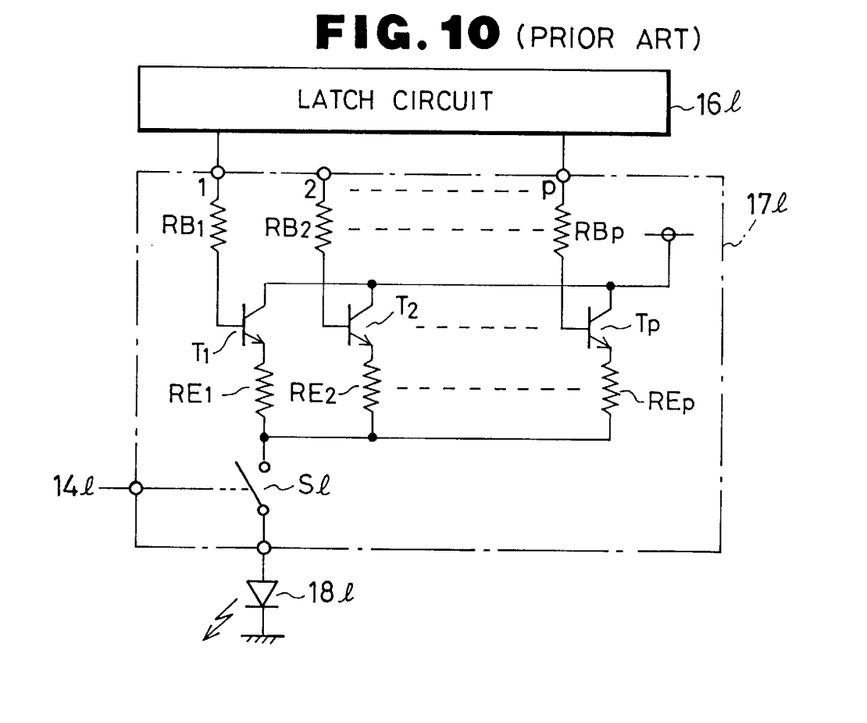
FIG. 10 is a circuit diagram of a current control circuit of FIG. 9.

FIG. 10 shows a circuit example of a single current control circuit $17_l$. In FIG. 10, the control circuit $17_l$ is constituted by transistors $T_1$–$T_p$ with each base connected to each bit terminal of the latch circuit 16 through a resistor $RB_1$–$RB_p$, and a switch $S_l$ installed at a connection path to connect the emitter of each of the transistors $T_1$–$T_p$ respectively through resistors $RE_1$–$RE_p$ to the LED chip $18_l$ and controlled by an output signal from AND gate $14_l$, so that current for the LED chip $18_l$ is controlled in response to the contents of the P-bit correction signal latched to the latch circuit $16_l$. In practice, l is on the order of 2000–4000 pixels per line and the number of strobe signals m is on the order of 8, such that each strobe signal functions to activate 250–500 LEDs.

Figure 11:
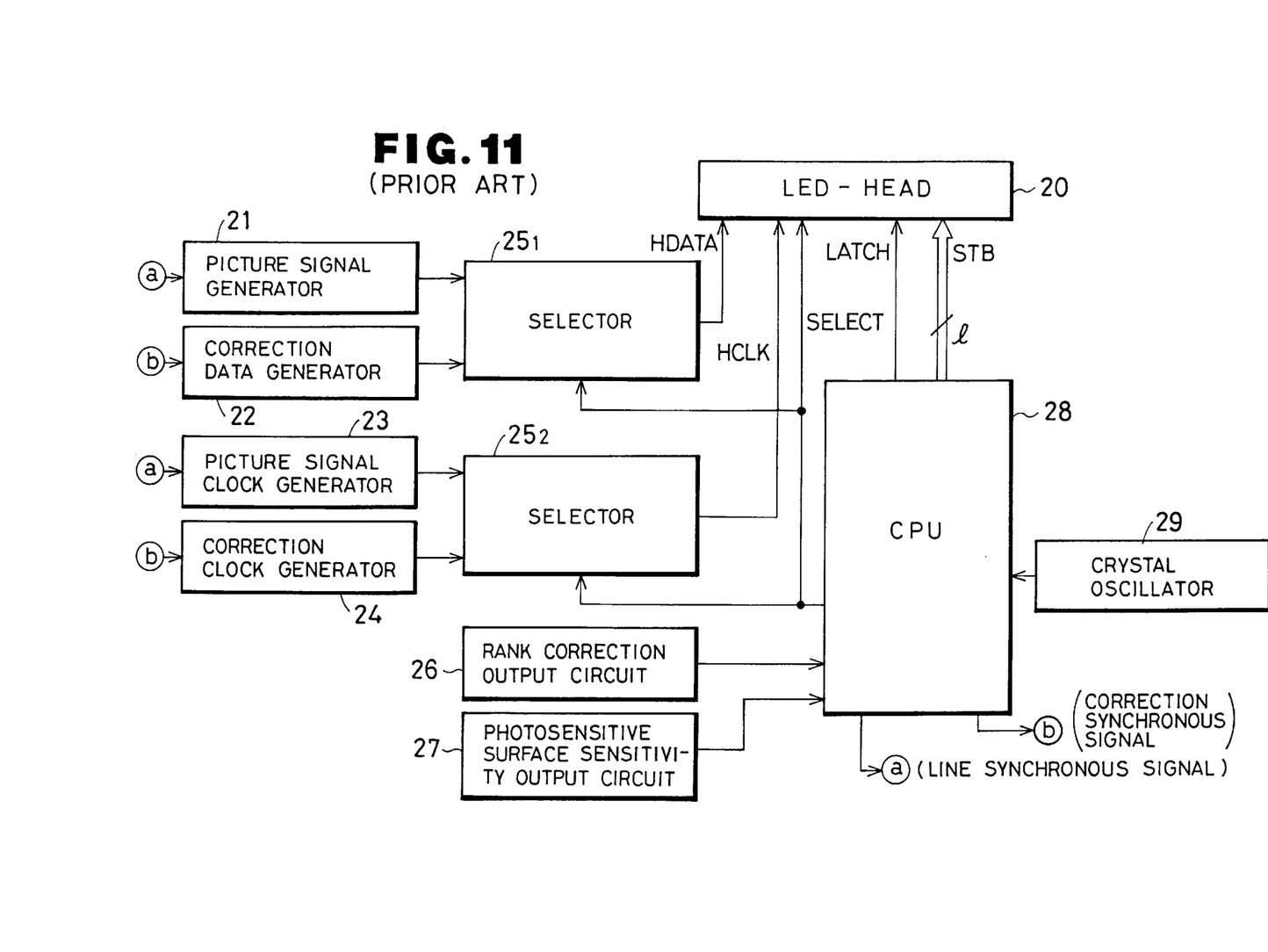
FIG. 11 is a block diagram of a picture processing circuit for controlling the LED-head of FIG. 9.

FIG. 11 is a block diagram of a picture processing circuit for controlling the LED-head 20 of the above-mentioned constitution. In FIG. 11, the picture processing circuit comprises a picture signal generator 21 for outputting a picture signal in response to line synchronous signal "a" from a CPU 28, a correction data generator 22 for outputting correction data in response to correction synchronous signal "b" from the CPU 28, a picture signal clock generator 23 for outputting a picture signal clock in response to the line synchronous signal "a" from the CPU 28, a correction clock generator 24 for outputting a correction clock in response to the correction synchronous signal "b" from the CPU 28, a selector $25_1$, for selecting one of the picture signal and the correction data in response to a select signal from the CPU 28, and a selector $25_2$ for selecting one of the picture signal clock and the correction clock in response to the select signal from CPU 28.

The picture processing circuit also comprises a rank correction output circuit 26 indicating a rank of the light quantity of the LED-head after being corrected by the correction data, a photosensitive body sensitivity output circuit 27 indicating the sensitivity of a photosensitive surface $1a$ formed on the photosensitive drum 1, and a crystal oscillator 29 for generating a master clock for the CPU 28. The rank of the LED-head refers to the overall level of brightness required to be produced by the LED-head according to the parameters of the specific apparatus in which it is installed and is determined before the LED-head is installed during manufacturing.

Figure 12:
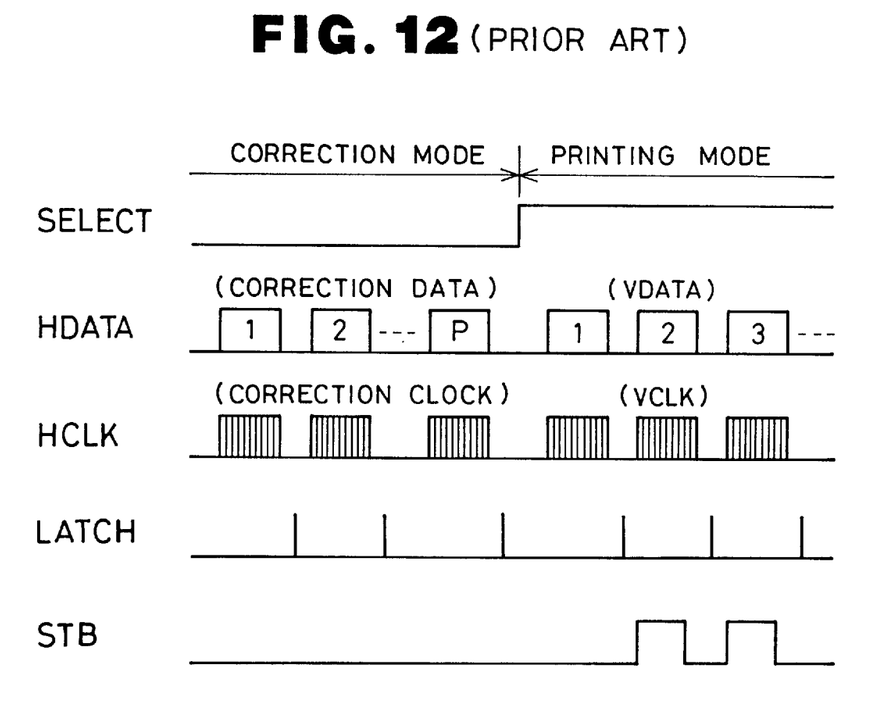
FIG. 12 is a timing chart explaining operation of the LED-head of FIG. 9.

Next, operation will be described referring to the timing chart shown in FIG. 12. First, unevenness correction data to obtain even brightness between each pixel and obtained during unit adjustment of the LED-head 20 is stored in the correction data generator 22, and the rank, indicating the light quantity of the corrected result is stored in the rank correction output circuit 26. Also, data indicating the light sensitivity of the photosensitive surface $1a$ is stored in the photosensitive surface sensitivity output circuit 27.

The select signal "SELECT" from the CPU 28 is made "L" thereby indicating the correction mode, the correction synchronous signal "b" is outputted from the CPU 28 to thereby transfer correction data and the correction clock from the correction data generator 22 and the correction clock generator 24 to the LED-head 20 through the selectors $25_1$ and $25_2$. Also the latch signal "LATCH" for the correction data is simultaneously outputted from the CPU 28 to latch circuits $16_1$–$16_l$.

After the above-mentioned correction, the select signal is made "H" thereby indicating the printing mode. In the printing mode, the CPU 28 outputs the line synchronous signal "a" so that the picture signal from the picture signal generator 21 and the picture signal clock from picture signal clock generator 24 are transferred to the LED-head 20, and after completing a one-line transfer, the LATCH signal is outputted from CPU 28 to latch circuit 13.

Through strobe signals $STB_1$–$STB_m$ for the light emission of the LED-head 20, the ON-time of each LED 18 is controlled by the CPU 28 in accordance with data previously inputted from the rank correction output circuit 26 and the photosensitive surface sensitivity output circuit 27. Consequently, the strobe signals are outputted with the correct ON-time for the image to be printed according to the rank and the sensitivity of the particular printer, and the above-mentioned data transfer and output of the latch signal and the strobe signals are repeated for each line, and thereby the printing is performed.

Since the picture processing apparatus in the prior art is constituted as described above, uniform exposure can be performed by the LED-head having a number of light emitting diodes arranged linearly. However, regarding the printing content, for example, if the same exposure amount supplied to the pixels of a whole black portion is supplied to the pixel at an isolated point, a problem of generating unevenness of the printing density will occur in that the black density is low at the whole black portion and high at the isolated point.

SUMMARY OF THE INVENTION

In order to overcome the above-mentioned problem in the prior art, an object of the invention is to provide a picture processing apparatus wherein a uniform printed picture can be obtained without density unevenness.

An image processing system according to the invention comprises a picture signal generator for generating a picture signal of an image to be printed, a light source head, including a shift register for storing (n×l) bits of picture signal data, where n is the number of bits per pixel and l is the number of pixels per line of said image, light source means for illuminating a photosensitive surface, control means for controlling the amount of luminance of said light source means in accordance with the values of each n-bits of data per pixel, a line memory for storing a plurality of lines of said picture signal from said picture signal generator, a density selective circuit for selecting correction density data for predetermined pixels of said picture signal based on the pattern of surrounding pixels from adjacent lines of picture signals inputted from said line memory, and a density correction circuit for outputting corrected picture signal data to said shift register in accordance with the correction density data selected by said density selective circuit.

PREFERRED EMBODIMENT OF THE INVENTION

An embodiment of the invention will now be described referring to the accompanying drawings.

Figure 1:
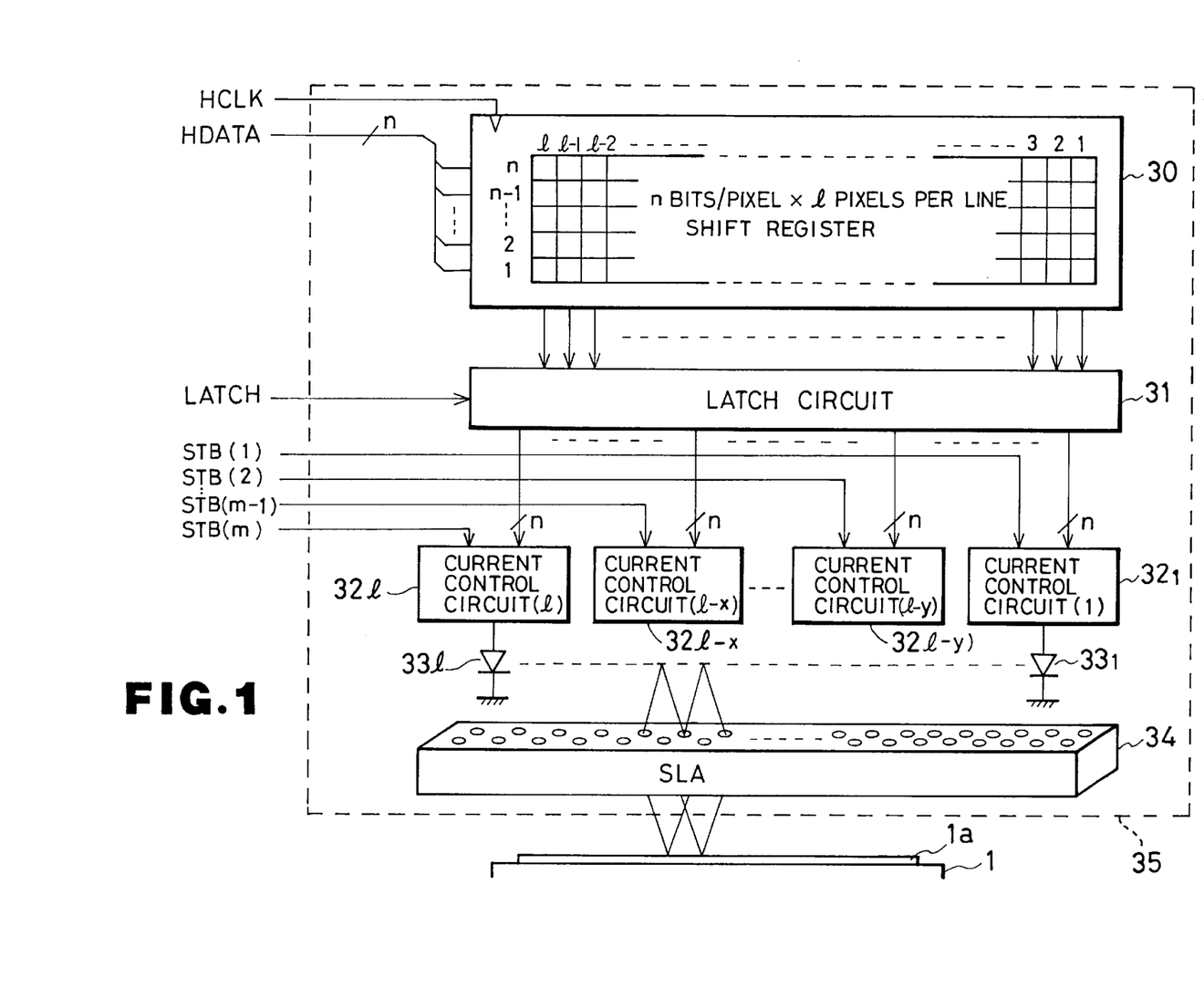
FIG. 1 is a constitution diagram of an LED-head in a picture processing apparatus as one embodiment of the invention.

FIG. 1 shows the constitution of an LED-head 35 according to one embodiment of the invention. In FIG. 1, the LED-head 35 comprises a shift register 30 for inputting n-bit picture signals for each of l pixels constituting one line in parallel synchronized with picture signal clock HCLK. For example, in a halftone system of 16 tones, n=4 bits for each pixel. A latch circuit 31 accepts and stores the contents of the shift register 30 in response to latch signal "LATCH", current control circuits $32_1$–$32_l$ are for controlling currents to LED chips $33_1$–$33_l$ in accordance with the content of the picture signals of n bits for each pixel, and a SELFOC lens array 34 for focusing light from the LED chips 33 onto the surface 1a of a photosensitive drum 1.

Figure 2:
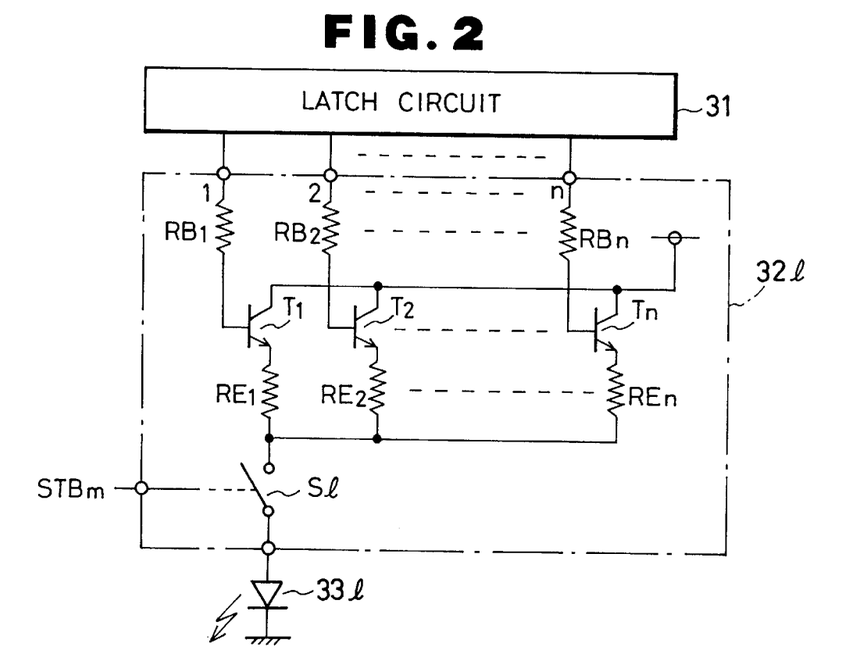
FIG. 2 is a circuit diagram showing an example of a current control circuit according to one embodiment of the invention.

FIG. 2 shows a circuit diagram of a single current control circuit. In FIG. 2, the control circuit $32_l$ is constituted by transistors $T_1$–$T_n$ with each base connected to each bit terminal of the latch circuit 31 through resistors $RB_1$–$RB_n$, and a switch S1 installed in a connection path to connect the emitter of each of the transistors $T_1$–$T_n$ respectively through resistors $RE_1$–$RE_n$ to the LED chip 33 l and controlled by strobe signal $STB_m$, so that current for the LED chip $33_l$ is controlled in response to the content of the n-bit signal latched by the latch circuit 31.

Figure 3:
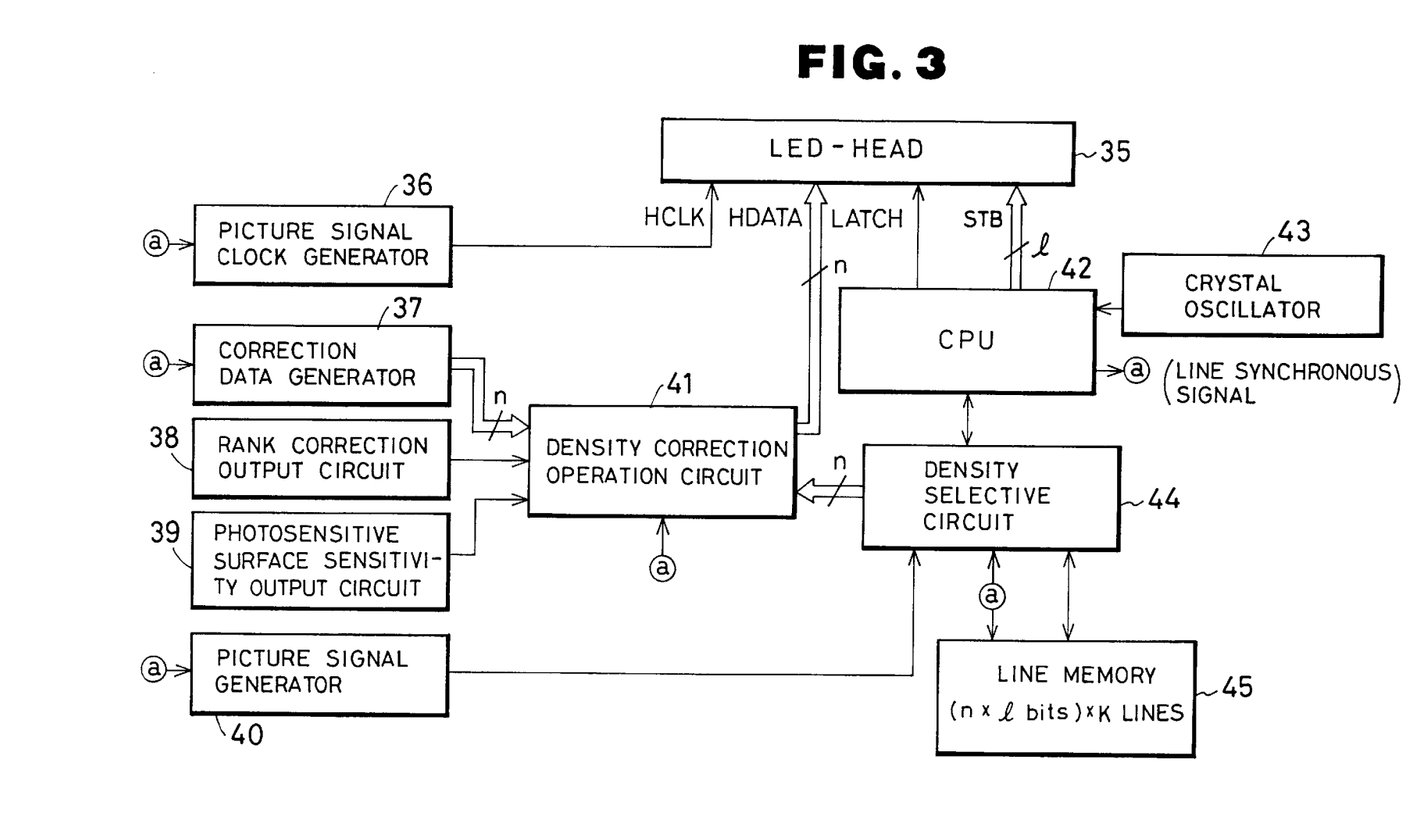
FIG. 3 is a block diagram of a picture processing circuit for controlling the LED-head of FIG. 1.

FIG. 3 is a block diagram of a picture processing circuit for controlling the LED-head 35 according to the present embodiment. In FIG. 3, the picture processing circuit comprises a picture signal clock generator 36 for outputting a picture clock in response to a line synchronous signal "a" from a CPU 42, a correction data generator 37 for outputting correction data in response to the line synchronous signal "a" from CPU 42, a rank correction output circuit 38 for storing the rank of the light quantity of the LED-head 35 after being corrected by the correction data, and a photosensitive surface sensitivity output circuit 39 for storing the sensitivity of a photosensitive surface 1a on the drum 1.

The picture processing circuit also comprises a picture signal generator 40 for outputting a picture signal in response to the line synchronous signal "a" from the CPU 42, and a density correction operation circuit 41 for outputting a corrected picture signal after the density correction based upon each correction coefficient of the correction data, the rank of the light quantity, the sensitivity of the photosensitive surface and the density selected by a density selective circuit 44 as hereinafter described. A crystal oscillator 43 generates a master clock for the CPU 42. The density selective circuit 44 is constituted by a matrix circuit for inputting picture signals of n bits and selecting the density of a pixel as a correction parameter at the center portion of the picture signal matrix in response to the black-and-white pattern of the surrounding pixels. Line memory 45 is capable of storing k lines of n×l bits per line (n-bits per pixel×l pixels).

Figure 4A:
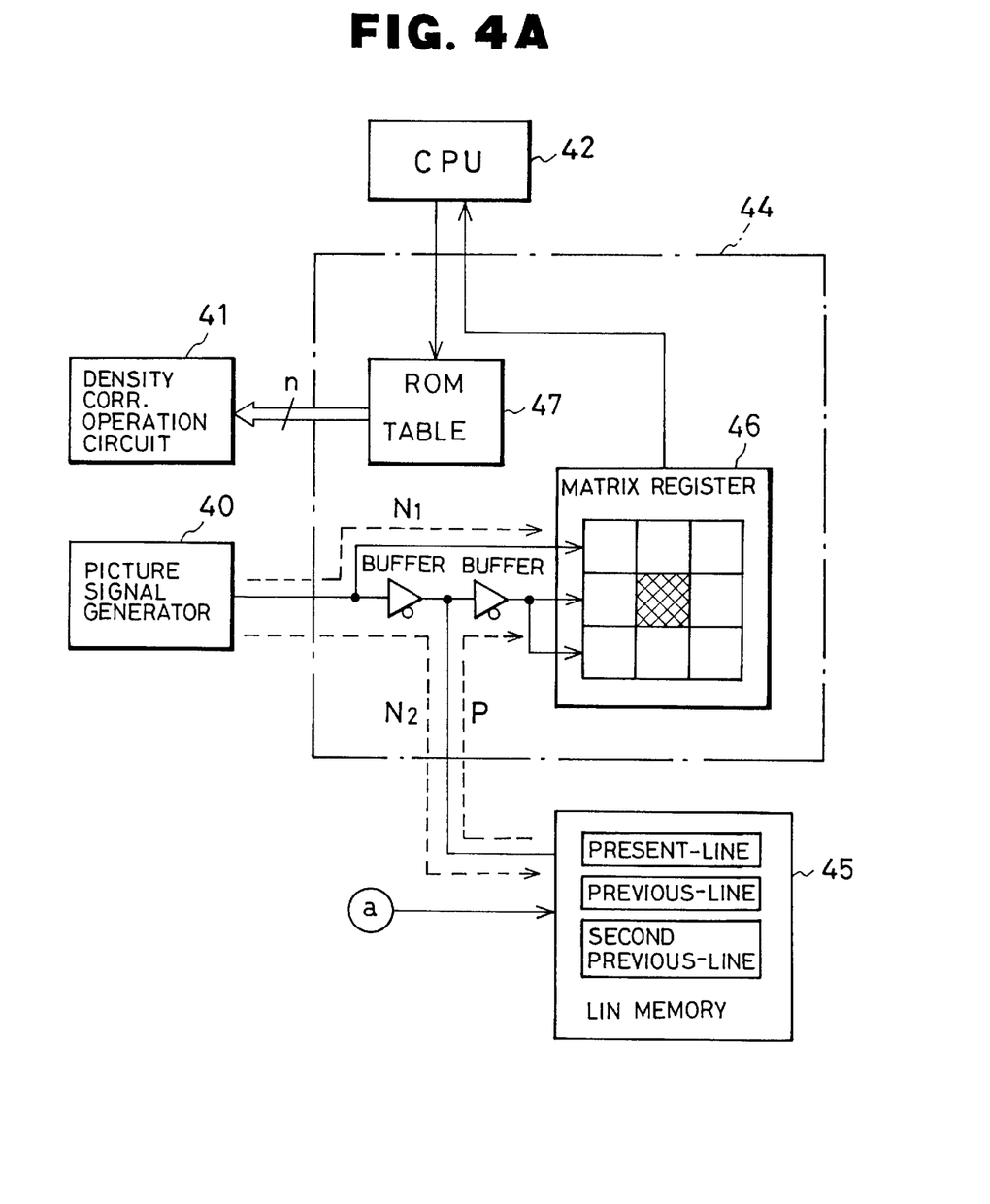
FIG. 4A is a block diagram of a density selective circuit of FIG. 3.

FIG. 4A shows an example of a density selective circuit 44 and a line memory 45. A one line picture signal is inputted to the top row of a matrix register 46 through path $N_1$, and to the present line storage area of line memory 45 through path $N_2$ via a buffer gate. The matrix register can hold three pixels of a line at one time. The previous line and the line prior to the previous line are stored in respective areas of the line memory and are inputted into the corresponding rows of the matrix register 46 through path P via a second buffer gate.

The input/output line switching of memory 45 is effected in response to the line synchronous signal a. In addition, timing of shifting every three pixels of each of the previous and second previous lines to the matrix register 46 is controlled by a timing generator (not shown).

The CPU 42 reads the pixel data for the 9 pixels in the matrix register 46 to determine whether each pixel is black or white. The function of the matrix register is to correct the density of the center pixel of the matrix according to the densities of the 8 surrounding pixels. If the center pixel is white, no correction is needed.

If the center pixel is black, the CPU inputs the pattern to the ROM table 47 to determine the corrected density of the center pixel. Since the 8 surrounding pixels can be either black or white, there are $2^8=256$ possible combinations which must be stored in the ROM table 47. The ROM table thus stores density correction data of n bits for each of these 256 combinations as well as a "0" correction value for the case where the center pixel is white. In the case of a half tone system of 16 steps, where n=4 bits, a pixel of "0" is white and "15" is black, with intermediate tones occurring therebetween. Based on the pattern inputted by the CPU, the ROM table 47 outputs the n-bit correction data to the density correction operation circuit 41.

Figure 4B:
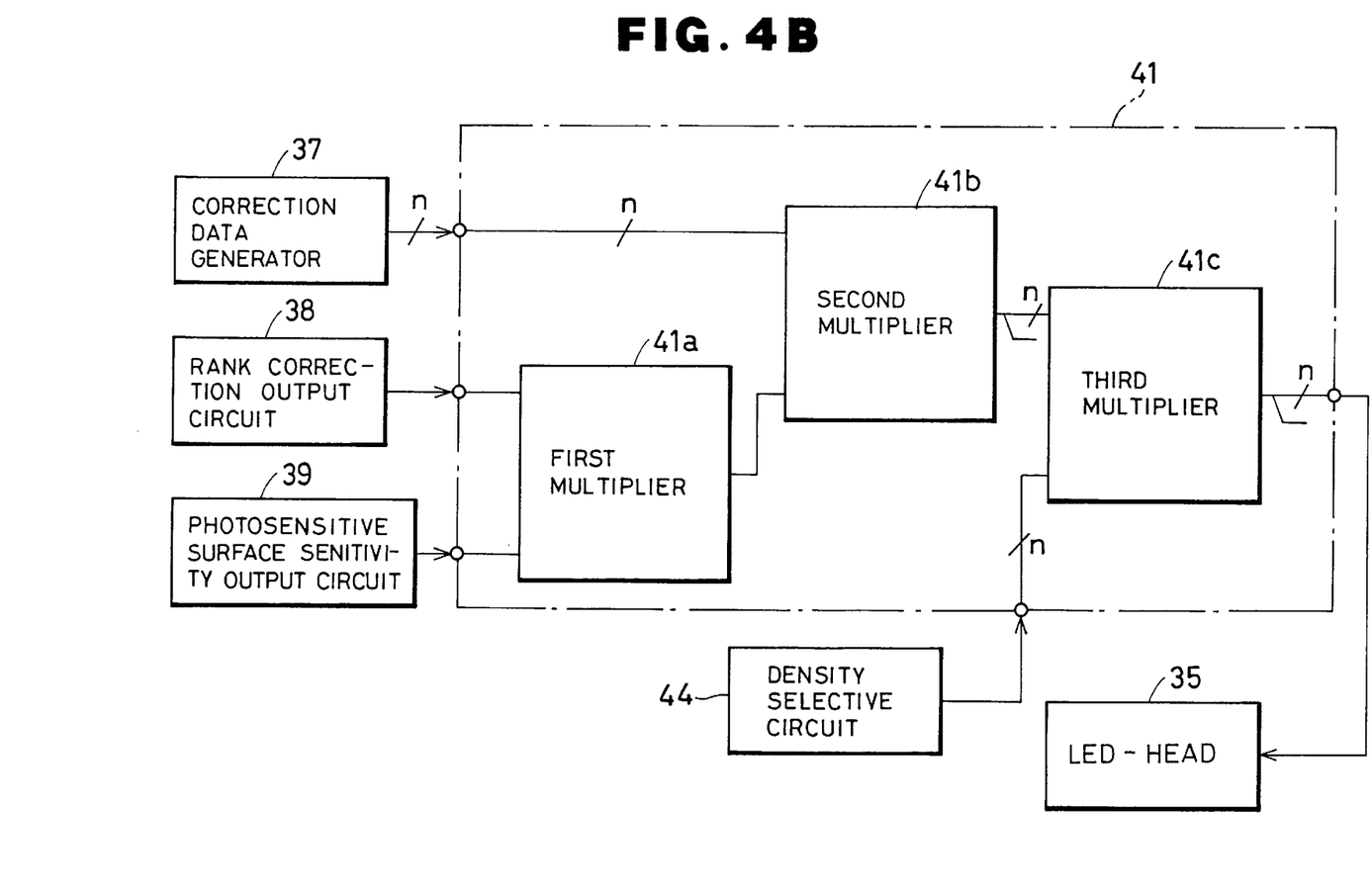
FIG. 4B is a block diagram showing an example of a density correction operation circuit of FIG. 3.

FIG. 4B shows a circuit block diagram example of the density correction operation circuit 41 which includes a first multiplier 41a for multiplying the output of the rank correction output circuit 38 by the output of the photosensitive surface sensitivity output circuit 39, a second multiplier 41b for multiplying the output of the correction data generator 37 by the output of the first multiplier 41a and a third multiplier 41c for multiplying the output of the second multiplier 41b by the output of the density selective circuit 44 and supplying the multiplication result to the LED-head 35. Each of the multipliers 41b and 41c outputs only the upper n bits of the multiplication result, and the lower n bits are discarded.

Next, operation of the this embodiment will be described referring to the timing charts in FIGS. 5 and 6 and the pixel pattern diagram in FIG. 7.

First, the unevenness correction data for each pixel of the LED-head 35 is obtained from the correction data generator 37, and rank correction data indicating the light quantity of the corrected result stored in the rank correction output circuit 38 and data indicating the sensitivity of the photosensitive surface 1a stored in the photosensitive body sensitivity output circuit 39 are also obtained.

The density correction operation circuit 41 performs operation processing of the correction data from the correction data generator 37, the rank correction data from the rank correction output circuit 38 and the sensitivity correction data from the photosensitive surface sensitivity output circuit 39 in accordance with the line synchronous signal "a" from the CPU 42, and produces corresponding n-bit density correction coefficients for the picture signals of n bits. That is, since the rank is a value common to all LED chips $33_1$–$33_l$ (common to all pixels) and also the sensitivity is determined by the photosensitivity surface being used (common to all pixels), if the unevenness correction data for each pixel is multiplied by each of the rank data and the sensitivity data as in the following formula, corresponding density correction coefficients for the picture signals of n bits can be obtained.

(density correction data)$_i$=(unevenness correction data)$_i$

×(rank correction data)×(sensitivity correction data)

where i:1–l

A picture signal from the picture signal generator 40 is then transferred to the density selective circuit 44 in response to the line synchronous signal "a", and the picture signals of k–1 lines previously transferred from the density selective circuit 44 before the present time are stored in the line memory 45. Here k=3 so that 2 previous lines are stored in the line memory 45.

Figure 5:
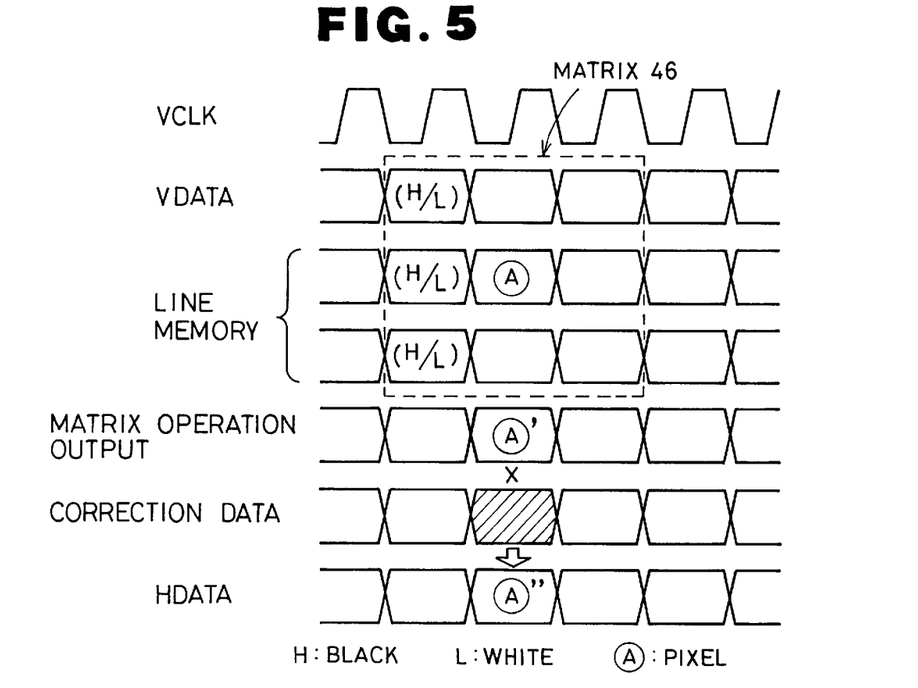
FIG. 5 is a chart diagram of density correction operation of pixels as correction objects according to the present invention.

In the density selective circuit 44, as shown in the timing chart in FIG. 5, for example, the picture signal matrix register 46 content is formed in accordance with the picture signal clock VCLK, and the correction density data for the pixel A is selected in accordance with the black-and-white patterns of the 8 surrounding pixels ($2^8$=256) from ROM table 47 as explained above.

Figure 7A:
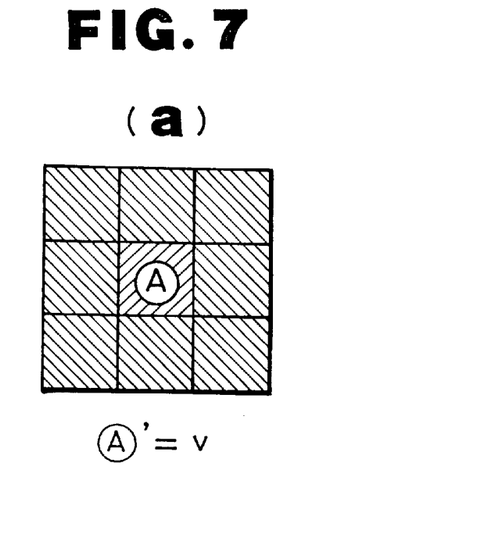
FIGS. 7(a) and (b) are pixel pattern diagrams.
Figure 7B:
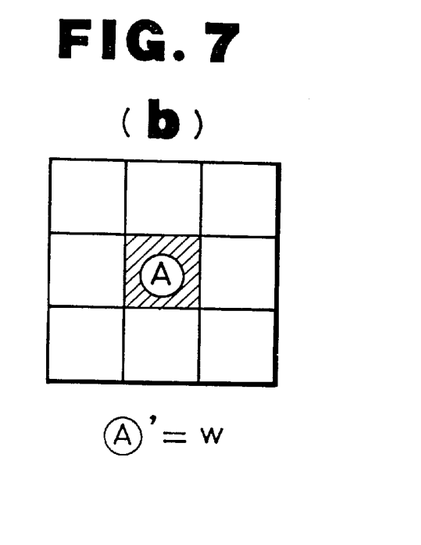

Specifically, as shown in FIG. 7(a), when the pixel A to be corrected is black and the eight surrounding pixels are all black, v is selected as the correction density A' from ROM table 47, and as shown in FIG. 7(b), when the pixel A to be corrected is black and the eight surrounding pixels are all white, w is selected as the correction density A' from ROM table 47.

In addition, v, w satisfy following relation, $$0<w<v<(2^n-1)$$

It is difficult to determine the above-mentioned v, w by a calculation formula, and the optimum values are thus determined by experiment under printing process conditions and are then stored in the ROM table or other equivalent storage device.

Subsequently the correction density A' selected by the density selective circuit 44 is processed by the density correction operation circuit 41 to perform operations of A'×(n-bit density correction data)$_i$ in multiplier 41c to output the n-bit picture signal A" with the corrected density to the shift register 30 of the LED-head 35. The picture signal A" incorporates density correction due to unevenness, rank, and sensitivity as well as the density correction obtained from black-and-white patterns of surrounding pixels, and the light emission amount of each LED chip can be arbitrarily controlled by the value of n bits constituting the picture signal A".

Figure 6:
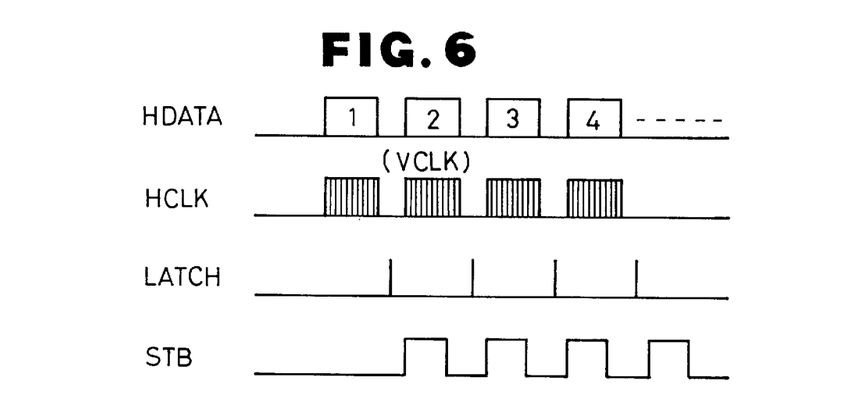
FIG. 6 is a timing chart explaining operation of the LED-head according to the present invention.

The drive timing of the LED-head 35 is controlled such that picture signals and picture signal clocks are inputted to shift register 30 as shown in FIG. 6, and after completing transfer of one line, latch signal "LATCH" is outputted. The strobe signals $STB_1$–$STB_m$ turn on the current control circuits $32_1$–$32_f$ for a definite time according to the timing for printing for the light emission of the LED chips $33_1$–$33_l$. The above-mentioned data transfer and output of the latch signals and the strobe signals are repeated for each subsequent line, thereby printing of a document is performed.

If other conditions affecting LED operation such as temperature variations are inputted to the density correction operation circuit 41, the operation will become even more effective.

As above described, according to the invention, the density of each pixel to be corrected is selected in response to the black-and-white patterns of the surrounding pixels and the density correction is performed by using the selected density and other correction coefficients, thereby the printing density is made uniform over the entire document and a clear recording image without density unevenness can be obtained irrespective of the content of image signals.

What is claimed is:

1. An image processing system comprising:

a picture signal generator for generating picture signal of an image to be printed;

a light source head, including a shift register for storing a(n×l) bits of picture signal data, where n is a number of bits per pixel and l is a number of pixels per line of said image, light source means for illuminating a photosensitive surface, said light source means comprising a plurality of LEDs;

control means for controlling an amount of luminance of said light source means in accordance with values of each n-bits of data per pixel, said control means comprising a plurality of current control circuits for controlling an amount of current supplied to respective LEDs of said light source means;

a line memory for storing a plurality of lines of said picture signal from said picture signal generator;

a density selective circuit for selecting correction density data for predetermined pixels of said picture signal based on a pattern of surrounding pixels from adjacent lines of picture signals inputted from said line memory; and a density correction circuit for outputting corrected picture signal data to said shift register in accordance with the correction density data selected by said density selective circuit, wherein said density correction circuit comprises:

a first multiplier for multiplying an output of a rank correction circuit indicating the rank of said system by an output of a photosensitivity correction circuit indicating the level of sensitivity of said photosensitive surface and outputting a result as an output of the first multiplier;

a second multiplier for multiplying said output of said first multiplier by an output of a correction data generator indicating unevenness correction data for each LED and outputting a result of multiplication by the second multiplier as an output of the second multiplier; and a third multiplier for multiplying said output of said second multiplier by an output of said density selective circuit to produce said corrected picture signal data.

* * * * *